US008607193B2

(12) United States Patent
Avrahami et al.

(10) Patent No.: US 8,607,193 B2
(45) Date of Patent: Dec. 10, 2013

(54) TRACKING STALE COMMENTS IN SOURCE CODE LISTINGS

(75) Inventors: Shlomit Avrahami, Jerusalem (IL); Joshua Fox, Emek Haela (IL); Yuri Kosharovsky, Gefen (IL); Michael Pelts, Tzur Hadasa (IL)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/350,828

(22) Filed: Jan. 16, 2012

(65) Prior Publication Data
US 2013/0185700 A1    Jul. 18, 2013

(51) Int. Cl.
G06F 9/44    (2006.01)
(52) U.S. Cl.
USPC ........... 717/120; 717/100; 717/101; 717/102; 717/103; 717/105; 717/123
(58) Field of Classification Search
None
See application file for complete search history.

(56) References Cited

U.S. PATENT DOCUMENTS

| 5,513,305 | A | 4/1996 | Maghbouleh |
| 6,026,233 | A | 2/2000 | Shulman et al. |
| 2005/0005258 | A1 | 1/2005 | Bhogal et al. |
| 2008/0228762 | A1* | 9/2008 | Tittizer et al. ............ 707/5 |
| 2008/0295085 | A1* | 11/2008 | Rachamadugu et al. ..... 717/159 |
| 2009/0210860 | A1* | 8/2009 | Sutherland et al. .......... 717/123 |
| 2010/0146491 | A1 | 6/2010 | Hirano et al. |
| 2010/0162093 | A1 | 6/2010 | Cierniak |
| 2012/0272207 | A1* | 10/2012 | Lerner et al. ................ 717/102 |

OTHER PUBLICATIONS

Fluri et al. 2009. Analyzing the co-evolution of comments and source code. Software Quality Control 17, 4 (Dec. 2009), 367-394.*
Fluri et al. 2007. Do Code and Comments Co-Evolve? On the Relation between Source Code and Comment Changes. In Proceedings of the 14th Working Conference on Reverse Engineering (WCRE '07). IEEE Computer Society, Washington, DC, USA, 70-79.*
Tan et al. 2007. /*icomment: bugs or bad comments?*/. In Proceedings of twenty-first ACM SIGOPS symposium on Operating systems principles (SOSP '07). ACM, New York, NY, USA, 145-158.*
Document! X—documentation made easy; http://www.innovasys.com/products/dx2011/overview.aspx.

* cited by examiner

Primary Examiner — Don Wong
Assistant Examiner — Adam Conkey
(74) Attorney, Agent, or Firm — North Shore Patents, P.C.; Michele Liu Baillie; Lesley A. Leonessa (57) ABSTRACT

Managing comments within computer software source code by detecting a change in a portion of computer software source code, identifying a comment that is associated with the portion, and providing an indication that the comment was not changed subsequent to the portion being changed.

20 Claims, 5 Drawing Sheets

```
public class Rectangle {
        private int height;

/**
*
* @param the height of the rectangle in inches, measurng from the inside border.
*/
public Rectangle(int height, int width) {    ←—306
        setHeight(height);
        setWidth (width);
}

/**
* Set the height of the rectangle in inches, measuring from the inside border.
* @param the height of the rectangle in inches, measuring from the inside border.
*/
private void setHeight(int height) {
        this.height - height;
}

/**
* Get the height of the rectangle in millimeters, measuring from the outside border.
* @return the height of the rectangle in millimeters, measuring from the outside border.
*/
private int getHeight() {
        return height;
}

TRACKING STALE COMMENTS IN SOURCE CODE LISTINGS

FIELD OF THE INVENTION

The present invention relates generally to systems and methods for maintaining computer software source code.

BACKGROUND OF THE INVENTION

In modern computer software development organizations, large computer software applications are typically developed by multiple software developers. In order to foster communication between software developers and explain programming decisions over time, software developers place comments within source code listings. Unfortunately, as the source code of a computer software application is modified over time, software developers often neglect to check whether existing comments need to be removed or updated to reflect such modifications, resulting in "stale" comments that no longer match the source code they are meant to describe. This often leads to software developers losing confidence in an application's source code comments altogether, effectively rendering even accurate comments unusable. As a result, software developers often abandon the maintenance and updating of an application's source code comments.

SUMMARY OF THE INVENTION

In one aspect of the present invention, a method is provided for managing comments within computer software source code, the method including detecting a change in a portion of computer software source code by a computing device, identifying a comment that is associated with the portion by the computing device, and providing an indication that the comment was not changed subsequent to the portion being changed by the computing device.

In other aspects of the present invention a system and a computer program product embodying the present invention are provided.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the present invention as a whole, and is not to be construed as limiting the present invention to the embodiments shown. It is appreciated that various modifications may occur to those skilled in the art that, while not specifically shown herein, are nevertheless within the true spirit and scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
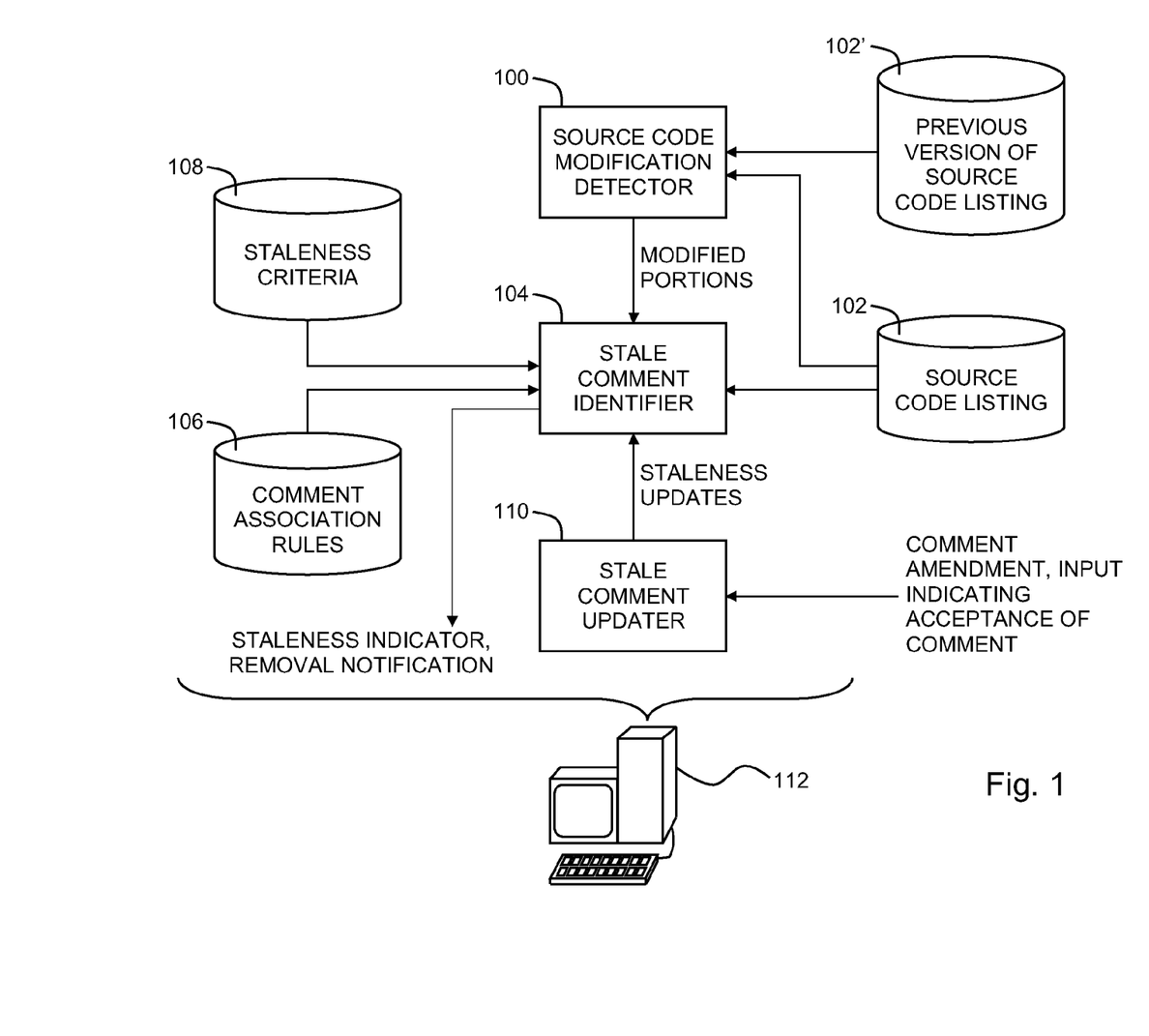
FIG. 1 is an illustration of a system for tracking stale comments in source code listings, constructed and operative in accordance with an embodiment of the present invention.

Reference is now made to FIG. 1 which is an illustration of a system for tracking stale comments in source code listings, constructed and operative in accordance with an embodiment of the present invention. In the system of FIG. 1, a source code modification detector 100 is configured to detect modifications to a source code listing 102 of a computer software application, where the modifications include source code that has been added, changed, or deleted. Source code modification detector 100 may be configured to detect modifications to source code listing 102 using conventional techniques, such as by monitoring source code listing 102 in real time and/or by monitoring a source code editing tool during a coding session involving source code listing 102. Additionally or alternatively, source code modification detector 100 may be configured to detect modifications to source code listing 102 by periodically examining source code listing 102 and comparing source code listing 102 to a previous version 102' of source code listing 102 to identify differences between source code listing 102 and previous version 102'. Additionally or alternatively, source code modification detector 100 may be configured to detect modifications to source code listing 102 by querying a Source Code Control system (not shown) that maintains a history of modifications to source code listing 102.

The system of FIG. 1 also includes a stale comment identifier 104 configured to identify comments within source code listing 102 that are associated with portions of source code listing 102 to which one or more modifications were made, such as where the modifications were detected by source code modification detector 100. Stale comment identifier 104 may be configured to determine that a given comment within source code listing 102 is associated with a given portion of source code listing 102 by applying one or more predefined comment association rules 106. For example, comment association rules 106 may include one or more of the following rules:

A comment preceding a function or class declaration is associated with entire function or class declaration A comment preceding a block is associated with the entire block A comment is associated with source code portion x if it has been manually associated with source code portion x.

For any, and preferably every, comment within source code listing 102 that is associated with a modified portion of source code listing 102, stale comment identifier 104 is preferably configured to provide a staleness indicator associated with the comment, such as by changing the color of some or all of the comment text when displayed on a computer display to a color, such as gray, that is different than a default comment color, such as black. Additionally or alternatively, the staleness indicator may take the form of a message that is displayed within or near the comment when the comment is displayed on a computer display, such as in a message box or a non-modal tooltip. The message may, for example, indicate that the portion of source code listing 102 associated with the comment was modified, and/or that the comment is or may be stale, no longer applicable, or not up to date, and/or that the comment was not modified subsequent to the portion being modified. Additionally or alternatively, the staleness indicator may be provided in a report that is provided independently from the comment being displayed on a computer display. Stale comment identifier 104 may provide the staleness indicator to the software developer who modified the source code portion of source code listing 102 associated with the comment, and/or to any member of a predefined group, such as of multiple software developers that collaboratively modify source code listing 102 during development of a computer software application.

Stale comment identifier 104 may be configured to associate any of several different staleness levels with a comment that is associated with a modified portion of source code listing 102, and associate different staleness indicators with the comment depending on the comment's staleness level. For example, where color is used as a staleness indicator, darker shades may be used to indicate lower staleness levels, and lighter shades to indicate higher staleness levels, and where messages are used, different message may be provided for different staleness levels. Stale comment identifier 104 may test a comment based on predefined staleness criteria 108, where each criterion present may contribute a predefined staleness factor to the comment's staleness level. For example, criteria 108 may include one or more of the following criteria:

A comment associated with a modified source code portion receives a staleness factor in proportion to the number of modified lines and the number of software developers that performed the modifications.

A comment associated with a modified code block/function/class receives a staleness factor if the name of the code block/function/class has been modified.

A comment associated with a modified code block/function/class receives a staleness factor if the signature of the code block/function/class or the names of its parameters have been modified.

A comment, whether or not it is associated with a modified source code portion, receives a staleness factor if a different comment having similar text is modified, where similarity may be determined using conventional techniques. For example, a Java™ Rectangle class may have a field height, and methods getHeight and setHeight. Its constructor may have a parameter height for setting this field. Moreover, the class may implement an interface with methods getHeight and setHeight. Where each of these elements have comments with similar text, such as "[Set/g24] the height of the rectangle in millimeters, measuring from the outside border," if one of these comments is modified, such as to "[Set/g25] the height of the rectangle in inches, measuring from the inside border," then the other comments very likely need to be modified.

The value of the staleness factors may vary from criterion to criterion, as well as within a criterion, such as where a greater staleness factor is used for a criterion if the software developer who modifies a code portion is different than the software developer who originally wrote or last modified the comment associated with the code portion, and a lesser staleness factor used otherwise. As software developers react to comment staleness indicators, such as by indicating that comments are still applicable and/or by modifying comments as needed, the staleness factors may be adjusted using standard multivariable regression techniques for machine-learning coefficients in linear combinations of variables.

The system of FIG. 1 also preferably includes a stale comment updater 110 configured to receive an input, such as from a software developer, indicating the acceptance of a comment with which a staleness indicator is associated, such as where the comment is deemed to be still relevant notwithstanding the modification to the portion of source code listing 102 associated with the comment. Additionally or alternatively, stale comment updater 110 is configured to detect when a comment, with which a staleness indicator is associated, is itself modified, thereby indicating the acceptance of the comment. Stale comment updater 110 is preferably configured to remove the staleness indicator associated with a comment that has been "rehabilitated" in this manner. Stale comment identifier 104 preferably notifies the multiple recipients when a staleness indicator is removed.

Any of the elements shown in FIG. 1 are preferably implemented by one or more computers or computing devices, such as computer 112, by implementing any of the elements shown in FIG. 1 in computer hardware and/or in computer software embodied in a non-transient, computer-readable medium in accordance with conventional techniques.

Figure 2:
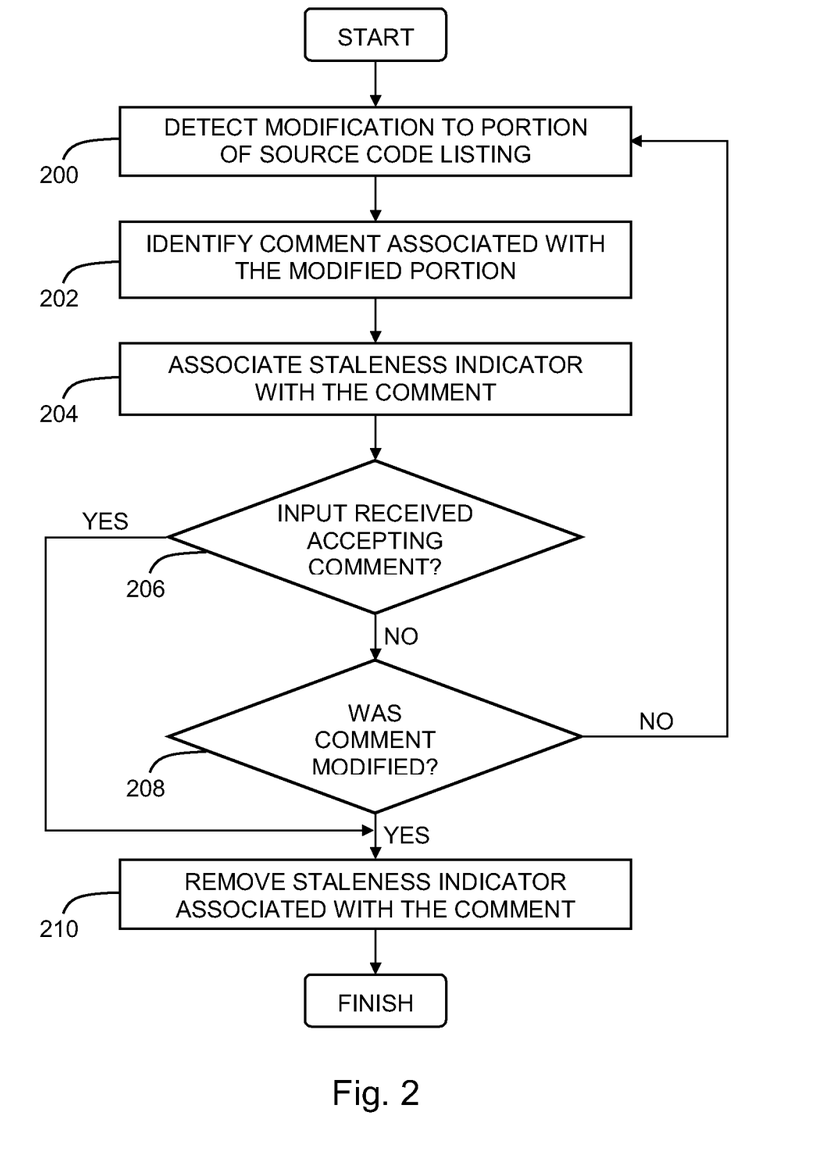
FIG. 2 is a flowchart illustration of an exemplary method of operation of the system of FIG. 1, operative in accordance with an embodiment of the present invention.

Reference is now made to FIG. 2 which is a flowchart illustration of an exemplary method of operation of the system of FIG. 1, operative in accordance with an embodiment of the present invention. In the method of FIG. 2, a modification to a source code listing of a computer software application is detected, where the modification includes source code that has been added, changed, or deleted (step 200). A comment is identified within the source code listing and that is associated with the portion of the source code listing to which the modification was made (step 202). A staleness indicator is associated with the comment (step 204). If an input is received indicating the acceptance of the comment (step 206), or if the comment itself is modified (step 208), the staleness indicator associated with the comment is removed (step 210).

Figure 3A:
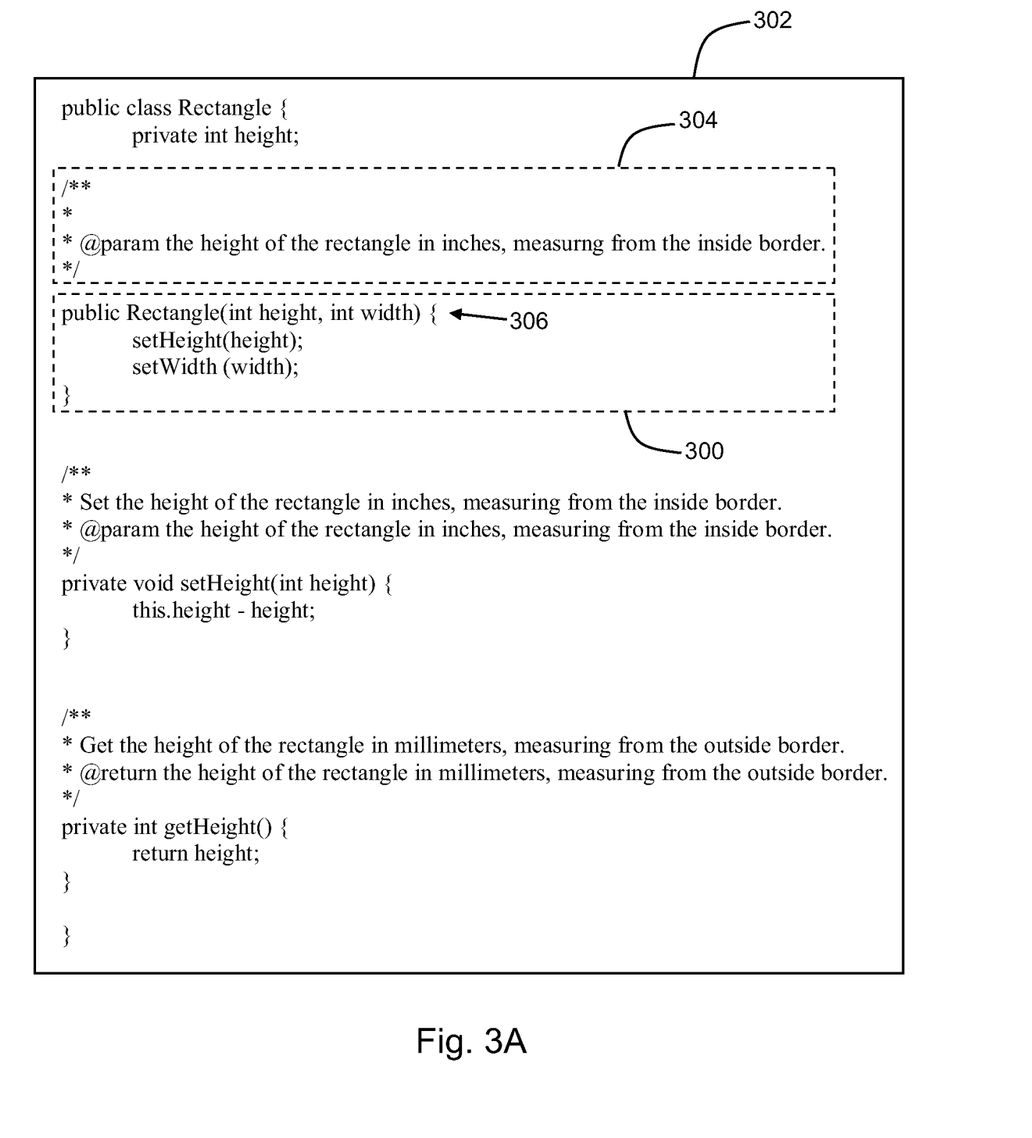
FIGS. 3A and 3B are sample source code listings illustrating an embodiment of the present invention.
Figure 3B:
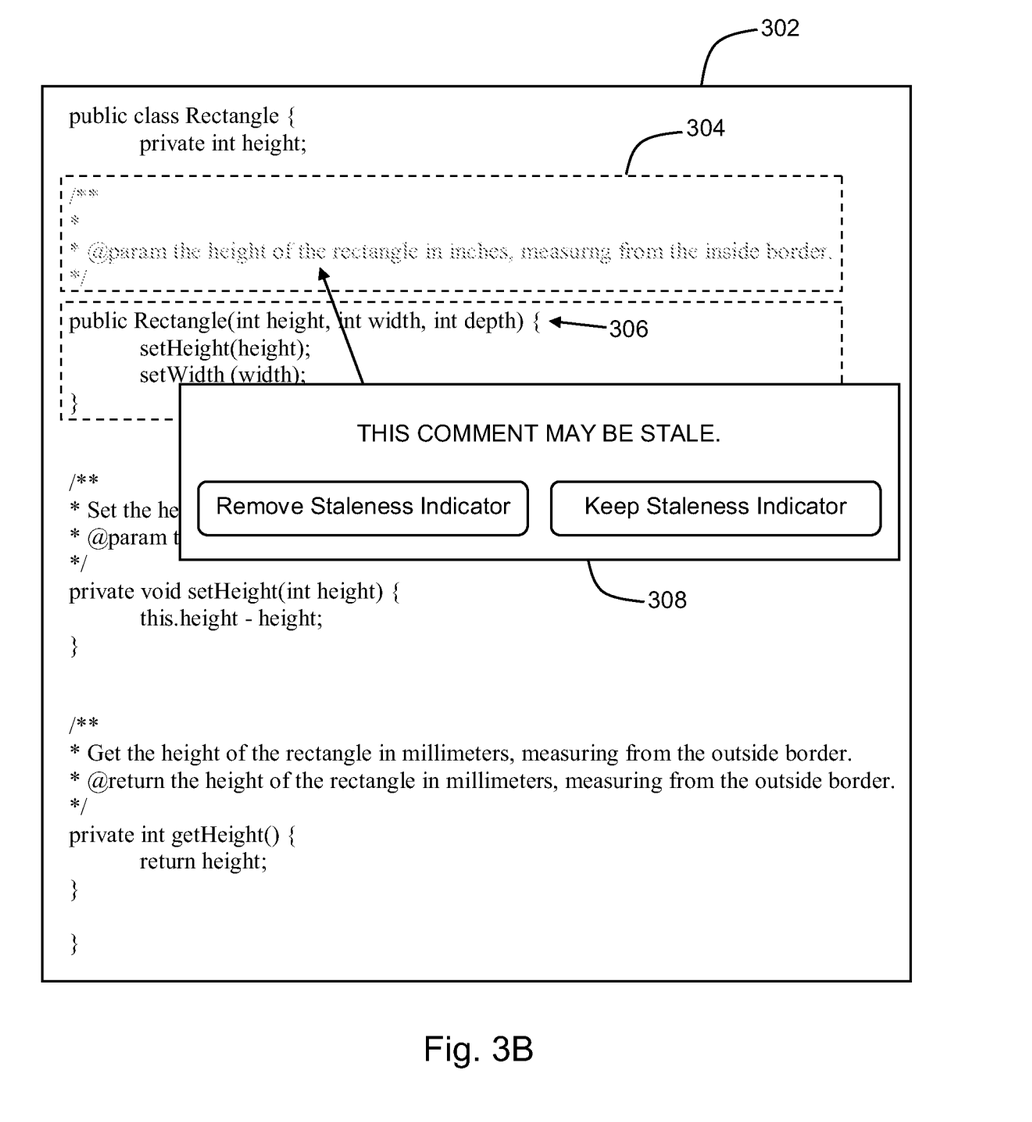

Application of the system of FIG. 1 and method of FIG. 2 may be illustrated by way of example with reference to FIGS. 3A and 3B. In FIG. 3A a portion 300 of a source code listing 302 is shown having an associated comment 304. When portion 300 is modified, such as where a line 306 is amended to include 'int depth', a staleness indicator is associated with comment 304 as shown in FIG. 3B, such as where the color of the text of comment 304 is changed from black to gray, and/or where a message box 308 is displayed indicating that comment 304 may be stale, and allowing a software developer who receives the message to remove or keep the staleness indicator.

Figure 4:
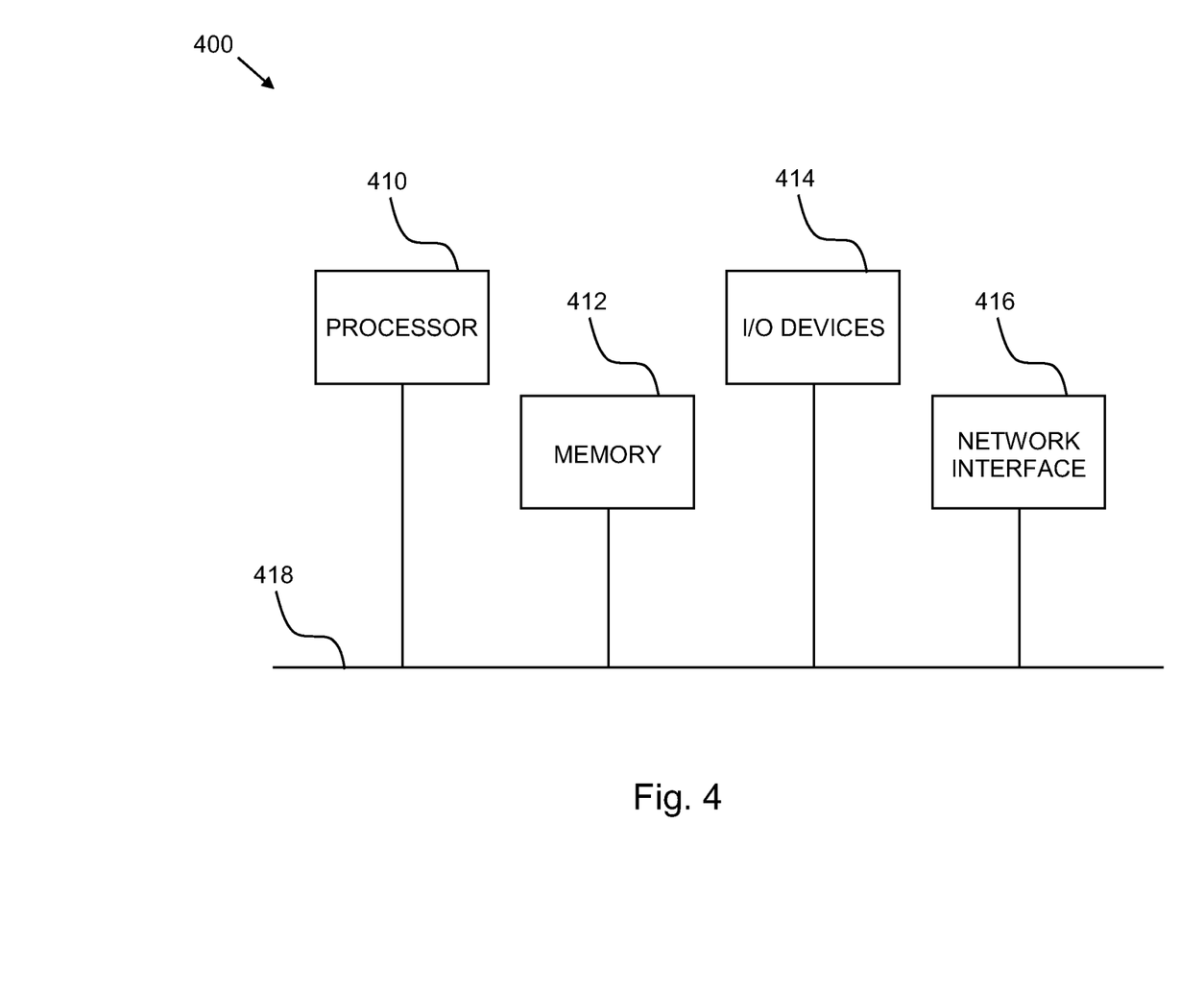
FIG. 4 is a block diagram illustration of an exemplary hardware implementation of a computing system, constructed and operative in accordance with an embodiment of the present invention.

Referring now to FIG. 4, block diagram 400 illustrates an exemplary hardware implementation of a computing system in accordance with which one or more components/methodologies of the present invention (e.g., components/methodologies described in the context of FIGS. 1-2) may be implemented, according to an embodiment of the present invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the present invention as a whole and is not to be construed as limiting the present invention to the embodiments shown. It is appreciated that various modi-

What is claimed is:

1. A method for managing comments within computer software source code, the method comprising:
   detecting a change in a portion of computer software source code by a computing device;
   identifying a comment that is associated with the portion by the computing device;
   in response to detecting a change in the portion, associating a staleness indicator with the comment, wherein the staleness indicator identifies a diminished relevancy associated with the comment, and wherein the staleness indicator remains associated with the comment until the staleness indicator is removed; and
   providing an indication, via the staleness indicator, that the comment was not changed subsequent to the portion being changed by the computing device.

2. The method of claim 1 and further comprising:
   receiving an input accepting the comment by the computing device, wherein acceptance of the comment indicates the comment maintains relevancy despite the change in the portion; and
   removing the indication, by the computing device, by removing the staleness indicator associated with the comment.

3. The method of claim 2 wherein the providing the indication, via the staleness indicator, that the comment was not changed subsequent to the portion being changed by the computing device comprises providing the indication to multiple recipients by the computing device, and
   wherein the removing the indication by the computing device comprises notifying the multiple recipients that the indication was removed by the computing device.

4. The method of claim 1 wherein the detecting the change in the portion of the computer software source code by the computing device comprises detecting by the computing device whether the change comprises a change to any of a name, a signature, or an implementation of any of a statement, a function, a class, or a block.

5. The method of claim 1 wherein the detecting the change in the portion of the computer software source code by the computing device comprises detecting by the computing device the change as the change is made.

6. The method of claim 1 wherein the detecting the change in the portion of the computer software source code by the computing device comprises detecting the change in a recorded history of changes made to the computer software source code by the computing device.

7. The method of claim 1 wherein the providing the indication, via the staleness indicator, that the comment was not changed subsequent to the portion being changed by the computing device comprises performing any of:
   changing the appearance of the comment, by the computing device, to indicate the diminished relevancy associated with the comment, or
   displaying a message on a computer display on which the comment is displayed, by the computing device, to indicate the diminished relevancy associated with the comment, wherein the message indicates that the comment was not changed subsequent to the portion being changed, and where the message is displayed separate from the comment and in propinquity to the comment.

8. The method of claim 1 and further comprising:
   detecting a change in the comment by the computing device, wherein the change in the comment indicates that the diminished relevancy is no longer associated with the comment; and
   removing the indication, by the computing device, by removing the staleness indicator associated with the comment.

9. The method of claim 1 and further comprising assigning, by the computing device, a staleness level to the indication, via the staleness indicator, wherein the providing the indication, via the staleness indicator, that the comment was not changed subsequent to the portion being changed by the computing device comprises providing, by the computing device, different versions of the staleness indicator corresponding to different staleness levels associated with the comment.

10. The method of claim 9 wherein the assigning, by the computing device, the staleness level to the indication, via the staleness indicator, comprises assigning the staleness level in proportion to any of an extent of the change to the portion, a number of coders that changed the portion, or an elapsed time since the change occurred by the computing device.

11. A computer program product for managing comments within computer software source code, the computer program product comprising:
    a computer readable storage medium having
    computer readable program code embodied therewith, the computer readable program code configured to:
      detect a change in a portion of computer software source code;
      identify a comment that is associated with the portion;
      in response to detecting a change in the portion, associate a staleness indicator with the comment, wherein the staleness indicator identifies a diminished relevancy associated with the comment, and wherein the staleness indicator remains associated with the comment until the staleness indicator is removed; and
      provide an indication, via the staleness indicator, that the comment was not changed subsequent to the portion being changed.

12. The computer program product of claim 11 wherein the computer readable program code is further configured to:
    receive an input accepting the comment, wherein acceptance of the comment indicates the comment maintains relevancy despite the change in the portion; and
    remove the indication, by removing the staleness indicator associated with the comment.

13. The computer program product of claim 12 wherein the computer readable program code configured to provide the indication, via the staleness indicator, that the comment was not changed subsequent to the portion being changed is further configured to provide the indication to multiple recipients, and
    wherein the computer readable program code configured to remove the indication is further configured to notify the multiple recipients that the indication was removed.

14. The computer program product of claim 11 wherein the computer readable program code configured to detect the change in the portion of the computer software source code is further configured to detect whether the change comprises a change to any of a name, a signature, or an implementation of any of a statement, a function, a class, or a block.

15. The computer program product of claim 11 wherein the computer readable program code configured to detect the change in the portion of the computer software source code is further configured to detect the change as the change is made.

16. The computer program product of claim 11 wherein the computer readable program code configured to detect the change in the portion of the computer software code is further configured to detect the change in a recorded history of changes made to the computer software source code.

17. The computer program product of claim 11 wherein the computer readable program code is further configured to perform any of
- change the appearance of the comment to indicate the diminished relevancy associated with the comment, and
- display a message on a computer display on which the comment is displayed, to indicate the diminished relevancy associated with the comment, wherein the message indicates that the comment was not changed subsequent to the portion being changed, and wherein the message is displayed separate from the comment and in propinquity to the comment.

18. The computer program product of claim 11 wherein the computer readable program code is further configured to
- detect a change in the comment, wherein the change in the comment indicates that the diminished relevancy is no longer associated with the comment; and
- remove the indication, by removing the staleness indicator associated with the comment.

19. The computer program product of claim 11 where in the computer readable program code is further configured to
- assign a staleness level to the indication, via the staleness indicator, in proportion to any of an extent of the change to the portion, a number of coders that changed the portion, or an elapsed time since the change occurred; and
- provide different versions of the staleness indicator corresponding to different staleness levels associated with the comment.

20. A system for managing comments within computer software source code, comprising:
- a processor; and
- a computer readable storage medium; and
- computer readable program code embodied in the computer-readable storage medium, wherein the computer readable program code is configured to
  - detect a change in a portion of computer software source code;
  - identify a comment that is associated with the portion;
  - in response to detecting a change in the portion, associate a staleness indicator with the comment, wherein the staleness indicator identifies a diminished relevancy associated with the comment, and wherein the staleness indicator remains associated with the comment until the staleness indicator is removed; and
  - provide an indication, via the staleness indicator, that the comment was not changed subsequent to the portion being changed.

* * * * *